(12) United States Patent
Gupta et al.

(10) Patent No.: US 8,099,361 B1
(45) Date of Patent: Jan. 17, 2012

(54) TRANSACTION PROCESSING SYSTEM THAT APPLIES USER-SPECIFIED RULES TO DIVIDE PAYMENT AMOUNTS AMONG MULTIPLE PAYMENT INSTRUMENTS

(75) Inventors: Vikas Gupta, Seattle, WA (US); Jeyandran Venugopal, Bellevue, WA (US); Xiaosi Li, Bainbridge Island, WA (US)

(73) Assignee: Amazon.com, Inc., Seattle, WA (US)

( * ) Notice: Subject to any disclaimer, the term of this patent is extended or adjusted under 35 U.S.C. 154(b) by 2736 days.

(21) Appl. No.: 10/634,135

(22) Filed: Aug. 4, 2003

(51) Int. Cl.
  *G06Q 40/00* (2006.01)
(52) U.S. Cl. .............................. 705/40; 705/39
(58) Field of Classification Search ........... 705/40
  See application file for complete search history.

(56) References Cited

U.S. PATENT DOCUMENTS

| | | | |
|---|---|---|---|
| 6,175,823 | B1 | 1/2001 | Van Dusen |
| 7,158,955 | B2 * | 1/2007 | Diveley et al. ................. 705/74 |
| 2002/0103753 | A1 * | 8/2002 | Schimmel ....................... 705/39 |
| 2002/0111886 | A1 * | 8/2002 | Chenevich et al. ............. 705/30 |
| 2003/0061171 | A1 * | 3/2003 | Gilbert et al. .................. 705/65 |
| 2004/0019500 | A1 * | 1/2004 | Ruth ................................ 705/1 |

FOREIGN PATENT DOCUMENTS

WO  WO 00/54122  9/2000

OTHER PUBLICATIONS

1—New Payment Plan . . . Risks; Noel Fung; South China Morning Post. Hong Kong: Nov. 4, 1995.p. 2.*
2. Consideration . . . MBA Program by Tucotte, Margaret M, Ph.D. The University Of Cunnecticur, 1993, 109 pages; AAT 9327353.*
3—Going back . . . college by Johnson Sharon Bolton, Ph.D. University of Miami, 1993, 240 pages; AAT 9412939.*

* cited by examiner

*Primary Examiner* — Hani M Kazimi
*Assistant Examiner* — Hatem Ali
(74) *Attorney, Agent, or Firm* — Knobbe, Martens, Olson & Bear LLP

(57) ABSTRACT

A network-based transaction processing system allows online users to flexibly and efficiently make payments using a combination of different payment instruments. The system includes a user interface through which each user can define one or more personal payment plans. Each such payment plan specifies a plurality of payment instruments, and includes rules that specify how the monetary amount associated with a transaction is to be divided among these payment instruments. These rules may be non-transaction-specific, such that a user can re-use a payment plan over time to complete multiple transactions. In one embodiment, a user can specify an order in which the payment instruments are to be applied, and can specify per-transaction maximum monetary amounts to be charged to specific instruments.

26 Claims, 7 Drawing Sheets

Create a payment plan      User: John Smith

Enter a descriptive name for this plan: [    ]

☑ Use as default for [All Transactions ▼]

Select First Payment Method
(We will use this method first, and will use the next payment method you specify only if this one fails or if a balance remains after we apply the maximum amount)

Maximum amount per purchase transaction. $[    ] (optional)

☐ Visa 39054 Exp: [10]/[2005]

☐ Union Bank Checking Acct. No. XXXXX532

☐ American Express 92657 Exp: [08]/[2005]

☑ Gift Certificate Account (Current Balance = $15.32)

☐ Add a New Gift Card #[    ] Type [    ▼]

☐ Add a New Credit Card Type [    ▼] Acct. No. [    ]

Exp: [  ]/[  ]  Billing Address: [    ]

Select Second Payment Method
(We will use this method second, and will use the next payment method you specify only if this one fails or if a balance remains after we apply the maximum amount)

Maximum amount per purchase transaction. $[    ] (optional)

☑ Visa 39054 Exp: [10]/[2005]

☐ Union Bank Checking Acct. No. XXXXX532

☐ American Express 92657 Exp: [08]/[2005]

☐ Gift Certificate Account (Current Balance = $15.32)

☐ Add a New Gift Card #[    ] Type [    ▼]

☐ Add a New Credit Card Type [    ▼] Acct. No. [    ]

Exp: [  ]/[  ]  Billing Address: [    ]

Select Third Payment Method
•

Add another Payment Method to this Plan

[Save Payment Plan]

*FIG. 2*

User: John Smith

Your Order

Table Lamp Model 4321:   $209.99
                         $ 12.60 (tax)
                           0.00 (shipping)
                  Total  $222.59

Select Payment Option

☐ Visa 39054 Exp: [10]/[2005]

☐ American Express 92657 Exp: [08]/[2005]

⋮

☐ Payment Plan | Primary ▼ |   create new payment plan
               | Personal Purchases ▼ |
               | Business Purchases ▲ |

☐ Select multiple payment methods for this transaction only

Your Order

User: John Smith

| | |
|---|---|
| Table Lamp Model 4321: | $209.99 |
| | $ 12.60 (tax) |
| | 0.00 (shipping) |
| Total | $222.59 |

Select Multiple Payment Methods

First Method    Max amount to use:    $[      ] (optional)

☐ Gift Certificate Balance of $9.29

☐ Visa    39054   Exp:[10]/[2005]

☐ American Express 92657  Exp:[08]/[2005]

☐ Union Bank Checking Acct. No. XXXXX532

☐ Add a New Gift Card #[        ]  Type[    ▼]

☐ Add a New Credit Card #[        ]  Exp:[  ]/[   ]

Name on card[        ]  Billing Address:[        ]

Second Method  Max amount to use:    $[      ] (optional)

☐ Gift Certificate Balance of $9.29

☐ Visa    39054   Exp:[10]/[2005]

☐ American Express 92657  Exp:[08]/[2005]

☐ Union Bank Checking Acct. No. XXXXX532

☐ Add a New Gift Card #[        ]  Type[    ▼]

☐ Add a New Credit Card #[        ]  Exp:[  ]/[   ]

Name on card[        ]  Billing Address:[        ]

Third Method    Max amount to use:    $[      ] (optional)

⋮

[Add another payment method]

or

[Proceed to order confirmation page]

*FIG. 4*

TRANSACTION PROCESSING SYSTEM THAT APPLIES USER-SPECIFIED RULES TO DIVIDE PAYMENT AMOUNTS AMONG MULTIPLE PAYMENT INSTRUMENTS

BACKGROUND OF THE INVENTION

1. Field of the Invention

The present invention relates to transaction processing systems and user interfaces that support the ability for a user to make an online payment using multiple payment instruments.

2. Description of the Related Art

Web sites and other types of interactive systems commonly include functionality for collecting payments from online customers. These systems commonly support a variety of different types of customer payment instruments, such as credit cards, paper and electronic gift certificates, and links to personal bank accounts. Typically, however, existing systems do not allow users to flexibly and efficiently use a combination of different payment instruments to complete a transaction.

SUMMARY OF THE INVENTION

The present invention provides a system through which online users can flexibly and efficiently make payments using a combination of different payment instruments or methods. In accordance with the invention, the system includes a user interface through which each user can define one or more personal payment plans. Each such payment plan specifies a plurality of payment instruments, and includes rules that specify how the monetary amount associated with a transaction is to be divided among some or all of these payment instruments. These rules may advantageously be non-transaction-specific, such that a user can re-use a payment plan over time to complete multiple transactions.

In one embodiment, the rules include an indication of an order in which the payment instruments are to be applied. When such an ordering is specified, a failed attempt by the system to use one payment instrument may automatically result in the next payment instrument being used. The rules may also specify maximum per-transaction monetary amounts to be applied to some or all of the payment instruments. For example, a given payment plan may specify that each payment transaction is to be completed as follows: initially use entire gift certificate balance, if any; then apply up to $500 of remaining amount due, if any, to credit card #1, then apply any remaining amount due to credit card #2. Other types of rules may additionally or alternatively be supported; for example, users may be given the option to specify percentages for dividing transaction amounts among the payment instruments, and/or may be permitted to control the behavior of the system when an attempt to use a given payment instrument fails.

Once a payment plan has been created, the user can preferably associate the payment plan with one or more specific orders, or other types of payment transactions, to specify how monetary funds are to be collected by the system. For example, in one embodiment, when placing an order with an online merchant, a user can select a previously-created payment plan to use, or can define a new payment plan to be used. Specific payment plans can thus be reused over time to reduce or eliminate re-entry of multiple-instrument payment information. To process a payment transaction using a specified payment plan, the system applies the associated rules to determine how the total payment amount is to be divided among the payment instruments. The division of the total payment amount may also depend upon whether an attempt to use a particular payment instrument fails.

The use of payment plans as set forth above provides a number of benefits to consumers and merchants. For example, because multiple credit cards or other payment instruments may be used, a consumer may be able to complete a given payment transaction even if none of the consumer's payment instruments is currently capable of supplying the entire payment amount (due to credit card limits, insufficient account balances, etc.). In addition, consumers can more easily and flexibly manage the account balances associated with specific payment instruments. Further, even if an attempt to charge one of the payment instruments fails (e.g., due to a processing error or the unavailability of requested funds), the transaction is still likely to go through due to the existence of other payment instruments, reducing the need for customer service involvement.

The system may also provide a number of additional features for facilitating consumer use of payment plans. For example, in one embodiment in which a given order can include items selected from multiple different merchants, the user interface allows the user to designate different payment plans to be used for different merchants. This may be desirable, for example, where the merchants do not accept the same types of payment methods. The system's user interface may also allow a user to specify that a refund is to be credited to a particular payment plan, which may but need not be the payment plan that was used to place the associated order.

Neither this summary nor the following detailed description is intended to define the invention. The invention is defined by the claims.

BRIEF DESCRIPTION OF THE DRAWINGS

FIG. 2 illustrates an example web page that may be used to create a re-usable payment plan in the system of FIG. 1.

FIG. 3 illustrates an example web page that may be used to select between various payment options in the system of FIG. 1.

FIG. 4 illustrates an example web page that may be used to create a transaction-specific payment plan.

DETAILED DESCRIPTION OF THE PREFERRED EMBODIMENTS

For purposes of illustration, the invention will now be described in the context of an electronic catalog system that supports the ability for users to purchase catalog items using payment plans. As will be recognized, the invention may also be used in other types of transaction processing systems that collect payments from online users, including but not limited to systems that provide general purpose user-to-user payment services. In addition, although described in the context of a web-based system, the invention may also be used within other types of interactive systems, such as proprietary online services networks, interactive television systems, and systems that support browsing by voice.

Figure 1:
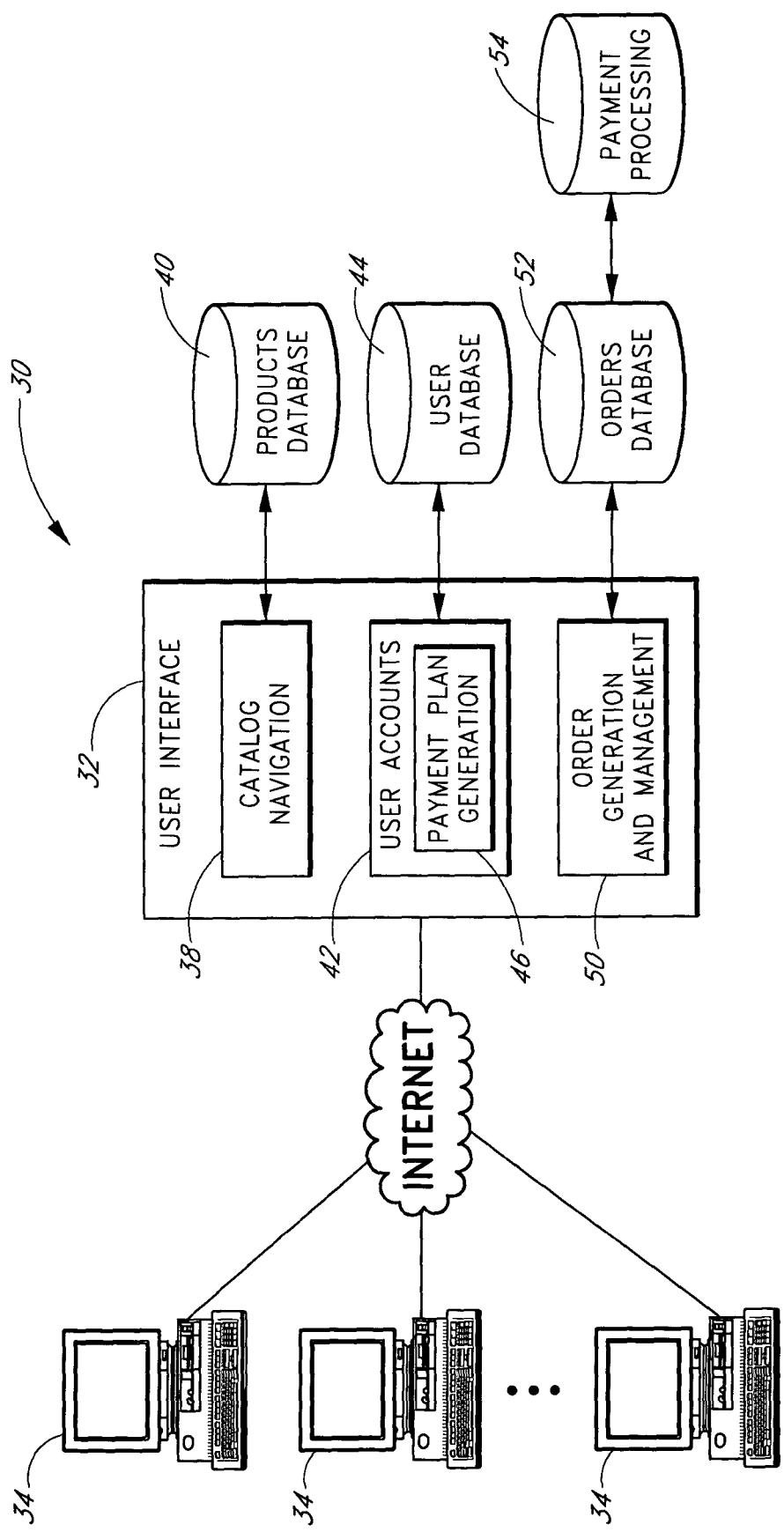
FIG. 1 illustrates the functional components of a network-based electronic catalog system according to one embodiment of the invention.

FIG. 1 illustrates the functional components of an electronic catalog system 30 according to a preferred embodiment of the invention. The system 30 includes a user interface 32 that may be accessed over the Internet by users via user computers 34 and/or other types of user devices (PDAs, cellular telephones, etc.). The user interface 32 preferably comprises web pages that may be viewed using an ordinary web browser, although other types of user interfaces may be used.

As illustrated in FIG. 1, the user interface 32 includes a catalog navigation component 38 that provides various pages and tools for allowing users to browse and make selections from an electronic catalog of products represented within a database 40. The products may include physical products that are shipped to consumers, digital products that are transmitted to the user computers 34 electronically, or a combination thereof. The catalog navigation component 38 may include, for example, a search engine for searching the products database 40, a browse tree for viewing products by category, and product detail pages that display detailed product information and allow users to select specific products for purchase. In some embodiments, the system 30 may allow users to view product offerings and make purchases from two or more different merchants.

The user interface 32 also includes a user accounts component 42 that provides functionality for users to set up and manage personal accounts. User account data collected by the user accounts component 42 is stored in a user database 44. The data stored for a given user may include, for example, authentication information, name, shipping address, and payment information (credit card account information, bank account information, etc.) A user's account data may also include definitions of one or more payment plans, as described below.

As depicted by the block 46 labeled "payment plan generation" in FIG. 1, the user interface 32 also includes functionality (web forms, etc.) for enabling each user to define one or more payment plans. Each such payment plan typically specifies a set of multiple payment instruments (also referred to as payment methods) that may be used to complete payment for specific transactions. A user may wish to define a payment plan in the preferred embodiment for one or both of the following reasons, among others: (1) to cause the system to divide transaction payment amounts among two or more different payment instruments, (2) to increase the likelihood that a transaction will complete successfully if an attempt by the system to use a payment instrument fails.

Each payment plan also preferably specifies rules that govern how the multiple payment instruments are to be used to complete a transaction. For example, each payment plan preferably specifies an order in which the payment instruments or methods are to be applied to collect payment for a transaction. A payment plan may also specify per-transaction maximum payment amounts for some or all of the payment instruments. For instance, a given payment plan may specify that each payment transaction is to be completed as follows: initially use entire gift certificate balance, if any; then apply up to $500 of remaining amount due, if any, to credit card #1, then apply any remaining amount due to credit card #2, etc. Each payment plan can preferably be saved for later use, and can be re-used over time to place multiple orders. As described below, users may also be given the option to define transaction-specific payment plans.

The user interface 32 also includes an order generation and management component 50 that provides functionality for users to place and manage orders for items in the electronic catalog. When a user places an order, the user is preferably given the option to select an existing payment plan, or to define a new payment plan. The user can alternatively specify a single payment method, such as a single credit card, to be used for payment.

The order generation and management component 50 also preferably allows a user to request a refund for a particular order, and to designate a set of payment instruments among which the refund amount is to be divided. For example, in one embodiment, the user can select a payment plan to which the refund amount is to be applied, in which case the same rules used to divide payment amounts may be used to divide the refund amount among the payment instruments. The refund amount may be applied to the same payment plan used to place the associated order, or, in some embodiments, to a different payment plan.

As illustrated, orders created by users are represented within an orders database 52. A payment processing component 54 handles the task of collecting payment for each order, including orders that designate payment plans (see FIG. 6, discussed below). For physical products purchased in-whole or in-part using a credit card, the credit card typically is not charged until after the ordered products are shipped; thus, when the order is placed, the system 30 may only obtain authorization for a charge to a particular credit card account, without actually charging the account.

FIG. 2 illustrates one example of a web form that may be used for allowing users to create re-usable payment plans. In this example, it is assumed that the user has previously supplied the details of several specific payment methods/instruments, including two credit card accounts and a checking account. In addition, it is assumed that the system 30 maintains personal gift certificate accounts for users, and allows users to apply their respective gift certificate balances to specific orders. The web form allows the user to specify any desired number of payment methods or instruments, with the first having the highest priority, the second having the second highest priority, and so on. The user can specify a payment method either by selecting a checkbox next to one of the listed payment methods, or by supplying the details for a new payment method.

For each specified payment instrument, the user can also enter a per-transaction maximum monetary amount. When such a maximum is specified, the monetary amount applied to that payment instrument for any given transaction will be less than or equal to the specified maximum. For example, if a user places an order for $200 using payment plan that designates a $100 limit for the first payment method, this first payment method will be used to collect the first $100 of the purchase price (assuming an attempt to use the first payment method is successful), and the remaining $100 will be collected using one or more subsidiary payment instruments. If a credit card account is specified as the first payment instrument in a payment plan, a maximum will typically need to be specified for that credit card account if the user wants transaction payment amounts to be divided among two or more of the specified payment instruments. The option to specify maximum payment amounts may be omitted in other embodiments, in which case the total payment amount may be divided among payment instruments using a different method, or may be collected solely using the first payment method that is not declined.

As indicated by the explanatory text in FIG. 2, when an attempt to use a particular payment method fails in the illustrated embodiment, the next payment method in the sequence is used (as opposed, for example, to automatically treating the transaction as unsuccessful). This aspect of the system increases the likelihood that transactions will be completed successfully. In an alternative embodiment, a transaction is treated as unsuccessful if any attempt to collect funds from a payment instrument is unsuccessful. Yet another option is to allow a user to specify, as part of the rules associated with a payment plan, whether the next sequential payment instrument should be used if the current payment instrument fails.

Although not depicted in FIG. 2, the user interface may additionally or alternatively support entry of other types of rules for governing the use of the multiple payment instruments. For example, the user interface may allow the user to specify a percentage of the overall transaction amount to be allocated to each payment instrument. These percentages may then be used by the payment processing component 54 to divide the total transaction amount among the multiple payment instruments.

As illustrated near the top of FIG. 2, the user may also be given the option to specify whether this payment plan is to be used as the default payment plan for some or all transactions. The associated drop down box may allow the user to set the payment plan as the default for one or more of the following types of transactions: (a) all transactions with a particular merchant, (b) all purchases of a particular type of item, (c) all purchases that exceed or that fall below a particular monetary amount.

Once all of the details of a payment plan have been entered, the user can save the payment plan under a descriptive name for later use. A given user may create any desired number of payment plans in the preferred embodiment, and select between these payment plans (and other payment options) when initiating payment for an order. As described below, the system may also allow a user to create a transaction-specific payment plan that is used only for a single transaction.

FIG. 3 illustrates an example page that may be used to obtain payment information for a user for an order being placed. In this example, the order is for a single product (table lamp) selected from the electronic catalog. The user is prompted to select from a list of possible payment options to pay for this item. This list includes specific credit cards that are on file for the user, and includes an option to select a previously-created payment plan. A drop-down list displays the names of three existing payment plans the user has created ("primary," "personal purchases," and "business purchases"), and allows the user to select one of these payment plans. A "create new payment plan" link is also provided for allowing the user to add a new payment plan. The list of payment options also includes a checkbox for allowing the user to specify multiple payment methods/instruments to create a transaction-specific payment plan. Once a payment option has been selected, the user can select the "continue" button to proceed with the checkout process.

FIG. 4 illustrates an example page that may be displayed when the user selects the option "select multiple payment methods for this transaction only" in FIG. 3 to create a transaction-specific payment plan. As with the page shown in FIG. 2, this page allows the user to specify an ordered set of payment methods to be used. The user can also optionally specify maximum monetary amounts to be used for each of the payment methods. In this example, because the user currently has a gift certificate balance, the user is given the option to use this balance as one of the payment methods. The user can also specify a new gift card or credit card to use as a payment method.

Figure 5:
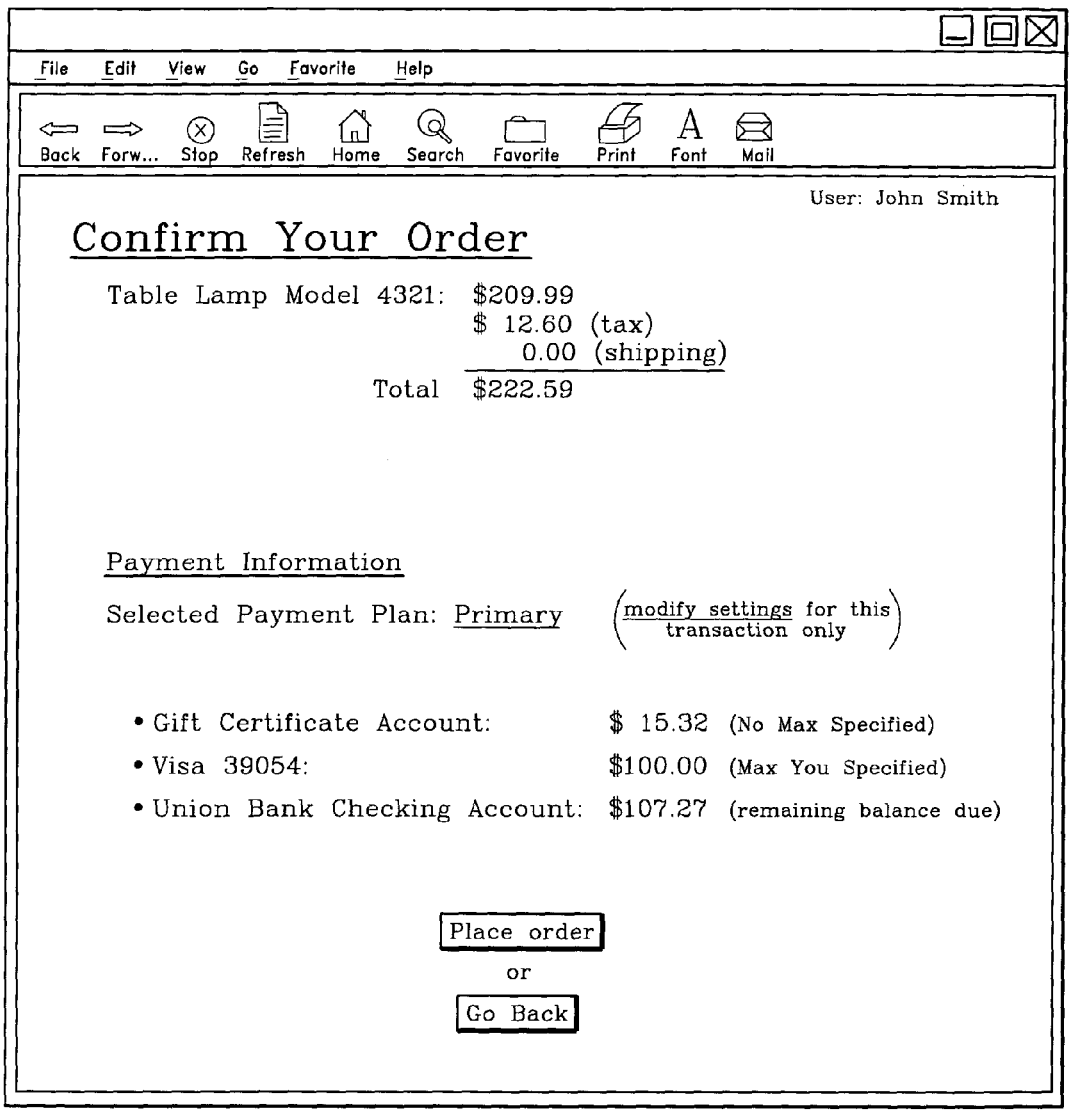
FIG. 5 illustrates an example order confirmation page.

FIG. 5 illustrates an example order confirmation page of the type that may be displayed when a user pays with a payment plan. In this example, the user has selected a payment plan that is saved under the name "primary." This payment plan includes at least three payment methods/instruments: a gift certificate account, a Visa credit card account, and a checking account with a bank. The order confirmation page indicates the amount that will be charged or applied to each such instrument, and indicates whether a maximum amount was specified by the user for each instrument. Credit card authorizations may be obtained prior to generation of the order confirmation page so that the displayed dollar amounts accurately reflect the amounts that will actually be charged to the credit card accounts. In addition, for the gift certificate account, the requisite funds ($15.32 in this example) may be encumbered prior to generation of the order confirmation page to prevent these funds from being used for a different transaction prior to completion of this transaction. If a credit card authorization fails during order placement, the order confirmation page may display an indication of the failure, and may show a different division of the total transaction amount among the available payment methods.

Figure 6:
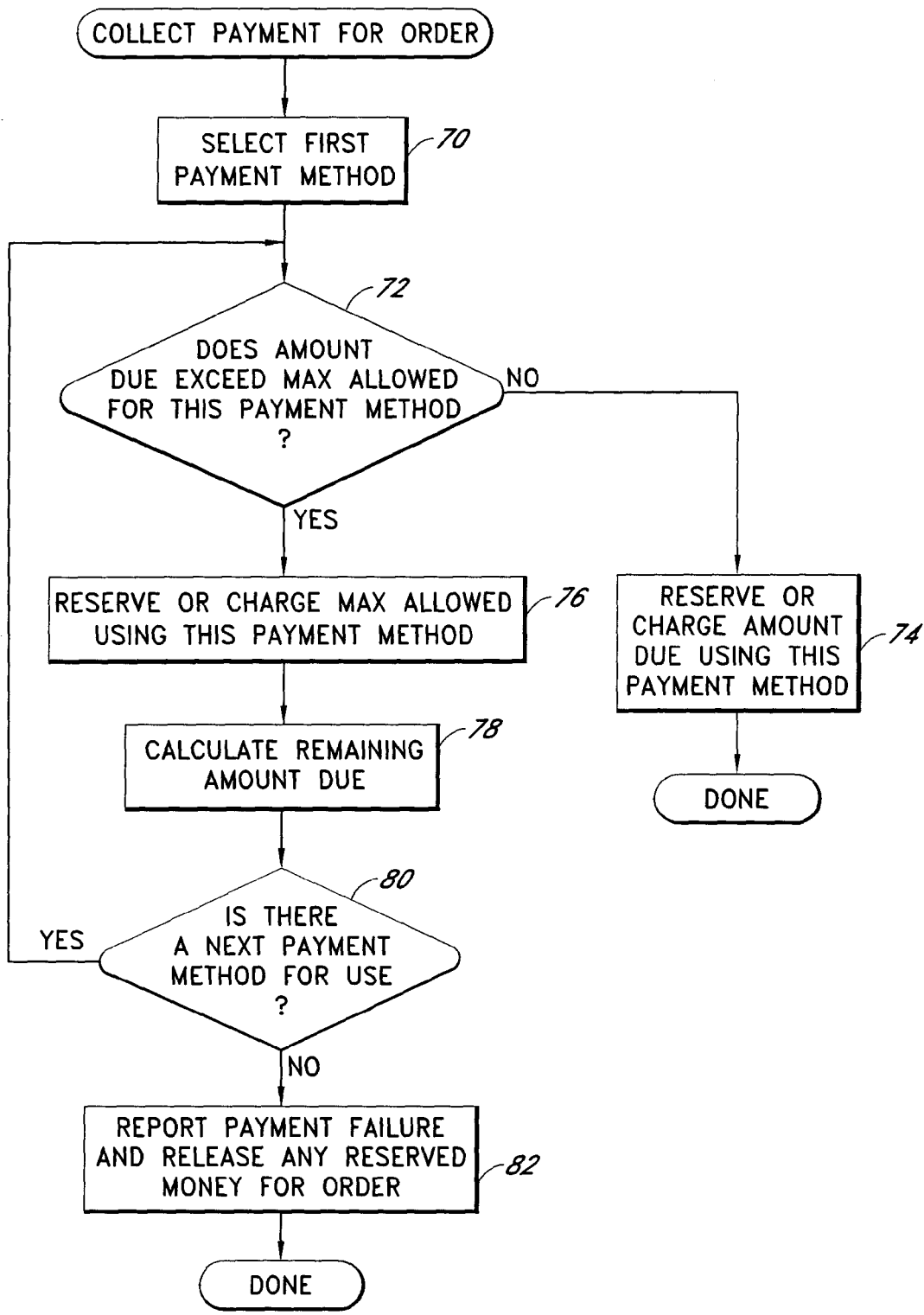
FIG. 6 illustrates the process flow that may be used by the payment processing component of FIG. 1 when a payment plan is used to collect payment.

FIG. 6 illustrates the general flow of a computer process that may be implemented within the payment processing component 54 (FIG. 1) to reserve or collect funds when a payment plan is used. The same or a similar process may be used to determine the amounts to be charged or applied to each instrument. As depicted by blocks 70 and 72, the process initially selects the first payment method in the user-specified sequence, and determines whether the total amount of the transaction exceeds the maximum amount (if any) specified for this payment method. If the first payment instrument is an account, such as a gift certificate account, maintained by an operator of the system 30, this maximum amount may be the amount of funds available in the account.

If the outcome of the determination in block 72 is negative, the first payment method is used to collect the entire amount of the transaction (block 74), and the process ends. Rather than actually charging the associated payment instrument at this point, the funds may be reserved or encumbered, and the actual charge may be made at a later time (such as when the order ships). If the outcome of the determination in block 72 is positive, the first payment method is used to collect the maximum amount allowed for the first payment method (block 76). The process then calculates the remaining amount due (block 78) and determines whether the payment plan includes a next payment method (block 80). If the determination in block 80 is positive, the process selects the next (second) payment method in the sequence, and goes back to block 72. If, on the other hand, no additional payment methods are specified, a payment failure is reported and any funds reserved in block 76 are released (block 82). The sequence of events represented by blocks 72-78 continues until either the entire amount of the transaction has been accounted for or a determination is made that the transaction amount cannot be collected using the payment plan.

In one embodiment, if an attempt to use a particular payment method in block 72 or block 74 is unsuccessful, the process skips that payment method and continues at block 72 with the next payment method. Thus, even though an attempt to use a particular payment method may fail, the transaction may complete successfully using other specified payment methods/instruments.

In one embodiment of the system 30 (not shown), a user can select items from multiple different merchants, and then place a single order to purchase these items from these merchants. In such scenarios, the user interface 32 may permit the user to designate a different respective payment plan (or a single payment method) for each merchant. Users can thus create and use merchant-specific payment plans, if desired. The system may also support the ability for a user to designate a particular payment plan as being the default for a particular merchant or transaction type.

Figure 7:
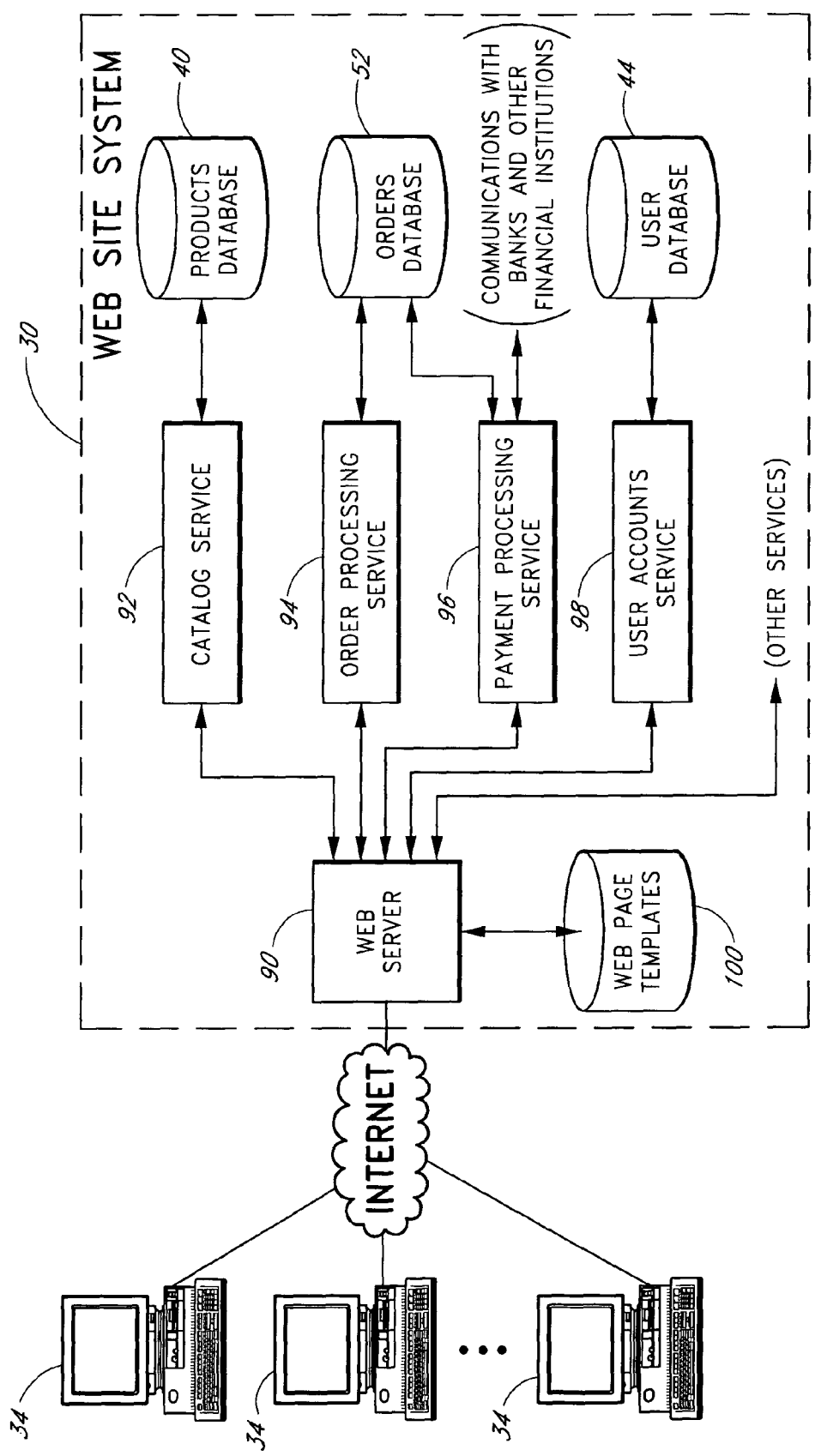
FIG. 7 illustrates a set of web site components that may be used to implement the system of FIGS. 1-6.

FIG. 7 illustrates an example set of web site components that may be used to implement the system 30. In this example, the web site system 30 includes a web server 90 that communicates with a set of web services, including a catalog service 92, an order processing service 94, a payment processing service 96, and a user accounts service 98. The web server 90 and each web service 92-98 may, for example, be implemented using a different respective physical server or set of physical servers, although numerous other allocations of software-implemented functionality to machines are possible. The web server 90 accesses a database of web page templates 100 that specify the general layout and content of each web page, and specify the service calls needed to populate the web pages and to process user submissions of data. For example, a separate template may be provided for each of the web pages shown in FIGS. 2-5.

The catalog service 92 is generally responsible for returning catalog information, including product descriptions, for display within specific web pages. The order processing service 94 is generally responsible for the creation and management of orders placed by users. The payment processing service 96 is generally responsible for handling the workflows associated with the various supported payment instruments, and for using payment plans to collect payments as depicted in FIG. 6. The user accounts service 98 is generally responsible for returning user account data, and for updating such data, in response to service calls. Numerous other services may be provided to support other types of functions.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by reference to the appended claims

What is claimed is:

1. An electronic transaction processing system, comprising:
    a computing system configured to provide:
    a payment plan generation component that provides user functionality for generating a re-usable payment plan that specifies at least (a) a plurality of payment instruments, and (b) non-transaction-specific rules for determining how the plurality of payment instruments are to be used to collect payment for a transaction, whereby users of the transaction processing system can create payment plans that may be re-used over time to complete transactions, said payment plan generation component comprising a computer processor, wherein the payment plan generation component provides user functionality for assigning names to payment plans, such that the payment plans may be subsequently selected by name for use;
    a transaction generation component that provides functionality for a user to generate a transaction, and to select a payment plan to complete payment for the transaction, said transaction generation component comprising a computer processor; and
    a payment processing component that is operative to use the rules to determine how to divide a total monetary amount of the transaction among the plurality of payment instruments, said payment processing component comprising a computer processor.

2. The system of claim 1, wherein the rules specify a sequence in which the plurality of payment instruments are to be applied.

3. The system of claim 2, wherein the payment processing component is responsive to a failed attempt to use one of the payment instruments by attempting to use the next payment instrument in said sequence.

4. The system of claim 3, wherein the rules further specify, for at least one of the payment instruments, a maximum per-transaction monetary amount to be charged thereto.

5. The system of claim 1, wherein the rules specify, for at least one of the payment instruments, a maximum per-transaction monetary amount to be charged thereto.

6. The system of claim 1, wherein the payment plan generation component provides user functionality for creating a payment plan that designates both credit card and non-credit-card payment instruments.

7. The system of claim 1, wherein the transaction generation component provides functionality for a user to generate an order that includes items selected from multiple different merchants, and to designate different respective payment plans for each of the merchants such that payment for the order is completed using multiple payment plans.

8. An electronic transaction processing system, comprising:
    a computing system configured to provide:
    a payment plan generation component that provides user functionality for generating a re-usable payment plan that specifies at least (a) a plurality of payment instruments, and (b) non-transaction-specific rules for determining how the plurality of payment instruments are to be used to collect payment for a transaction, whereby users of the transaction processing system can create payment plans that may be re-used over time to complete transactions, said payment plan generation component comprising a computer processor;
    a transaction generation component that provides functionality for a user to generate a transaction, and to select a payment plan to complete payment for the transaction, said transaction generation component comprising a computer processor; and
    a payment processing component that is operative to use the rules to determine how to divide a total monetary amount of the transaction among the plurality of payment instruments, said payment processing component comprising a computer processor, wherein the payment processing component is additionally operative to apply a refund to a payment plan such that an amount of the refund is divided among multiple payment instruments.

9. A computer-implemented method of collecting payments from online users, comprising:
    receiving input from an online user defining a payment plan that specifies a plurality of payment instruments, and specifies non-transaction-specific rules for determining how the plurality of payment instruments are to be used to collect payment for a transaction;
    storing a definition of said payment plan in computer storage for subsequent use in association with an account of the user, wherein the definition is stored under a user-specified name such that the payment plan may be recalled for subsequent use;
    receiving input from the user specifying a payment transaction to be executed using said payment plan, said transaction having a payment amount; and
    dividing, by a computer system, the payment amount among at least two of the plurality of payment instruments according to the non-transaction-specific rules.

10. The method of claim 9, wherein the non-transaction-specific rules specify at least the following: (a) an order in which the payment instruments are to be applied, and (b) for at least one of the payment instruments, a maximum monetary amount to be applied thereto.

11. The method of claim 10, wherein the step of dividing the payment amount comprises applying a portion of the payment amount to a first payment instrument, said portion being equal to and based on said maximum monetary amount, and applying a remaining portion of the payment amount to one or more other payment instruments.

12. The method of claim 10, wherein the step of dividing the payment amount comprises attempting to use a first payment instrument, and when the attempt fails, skipping to a second payment instrument.

13. The method of claim 9, wherein the step of dividing the payment amount comprises charging a first credit card account for a first portion of the payment amount, and charging a second credit card account for a second portion of the payment amount.

14. The method of claim 9, wherein the payment amount is divided among at least one credit card account and at least one non-credit-card account.

15. The method of claim 9, wherein the definition further specifies a type of transaction for which the payment plan is to be used.

16. A computer-implemented method of collecting payments from online users, comprising:
    receiving input from an online user defining a payment plan that specifies a plurality of payment instruments, and specifies non-transaction-specific rules for determining how the plurality of payment instruments are to be used to collect payment for a transaction;
    storing a definition of said payment plan in computer storage for subsequent use in association with an account of the user;
    receiving input from the user specifying a payment transaction to be executed using said payment plan, said transaction having a payment amount;
    dividing the payment amount among at least two of the plurality of payment instruments according to the non-transaction-specific rules; and
    responding to a user request for a refund for said transaction by reversing charges applied to each of the at least two payment instruments.

17. The method of claim 9, wherein the non-transaction-specific rules include user-specified percentages, and the method comprises dividing the payment amount among the at least two payment instruments according to the percentages.

18. The method of claim 9, wherein the payment transaction is a consumer-to-merchant payment transaction in which the user makes a single payment to a merchant using multiple payment instruments of the user.

19. The method of claim 9, further comprising re-using the payment plan over time to execute multiple user-to-merchant payment transactions.

20. The method of claim 9, wherein the method comprises dividing the payment amount among multiple payment instruments of the user to make a payment from the user to a merchant.

21. The system of claim 1, wherein the payment plan generation component provides user functionality for a consumer to create a personal payment plan that includes non-transaction-specific rules that specify how a monetary amount of a payment transaction is to be divided among multiple payment instruments of the consumer, and the transaction generation component enables the consumer to selectively use the personal payment plan to make a payment to a merchant.

22. The system of claim 1, wherein the non-transaction-specific rules include user-specified percentages for dividing a transaction-specific payment amount among multiple payment instruments of the user.

23. The system of claim 1, wherein the payment plan generation component comprises a web server machine that serves web pages that provide said user functionality.

24. The system of claim 1, wherein the system comprises a plurality of physical machines that implement said payment plan generation component, said transaction generation component and said payment processing component.

25. The method of claim 9, wherein the method, including receiving input defining the payment plan, storing the definition of the payment plan, receiving input specifying the payment transaction, and dividing the payment amount, is performed automatically by a system that comprises a plurality of physical servers.

26. The method of claim 9, wherein the method, including receiving input defining the payment plan, storing the definition of the payment plan, receiving input specifying the payment transaction, and dividing the payment amount, is performed via execution of instructions by computer hardware.

* * * * *